US011538070B2

(12) United States Patent
Taudes

(10) Patent No.: US 11,538,070 B2
(45) Date of Patent: Dec. 27, 2022

(54) BLOCKCHAIN-BASED SYSTEM AND METHOD FOR PEER-TO-PEER ONLINE ADVERTISING AUCTION

(71) Applicant: LINKPLICITY GMBH, Vienna (AT)

(72) Inventor: Patrick Taudes, Vienna (AT)

(73) Assignee: LINKPLICITY GMBH, Vienna (AT)

( * ) Notice: Subject to any disclaimer, the term of this patent is extended or adjusted under 35 U.S.C. 154(b) by 130 days.

(21) Appl. No.: 17/003,663

(22) Filed: Aug. 26, 2020

(65) Prior Publication Data
US 2021/0319479 A1 Oct. 14, 2021

Related U.S. Application Data

(60) Provisional application No. 63/009,139, filed on Apr. 13, 2020.

(51) Int. Cl.
*G06Q 30/02* (2012.01)
*G06Q 20/38* (2012.01)
(Continued)

(52) U.S. Cl.
CPC ......... *G06Q 30/0275* (2013.01); *G06Q 20/02* (2013.01); *G06Q 20/223* (2013.01);
(Continued)

(58) Field of Classification Search
CPC .. G06Q 30/0275; G06Q 20/02; G06Q 20/223; G06Q 20/389; G06Q 2220/00;
(Continued)

(56) References Cited

U.S. PATENT DOCUMENTS

| 8,782,422 B2 * | 7/2014 | Shevade | H04L 9/3236 |
| | | | 705/79 |
| 10,402,861 B1 * | 9/2019 | Banadaki | G06Q 30/0277 |

(Continued)

FOREIGN PATENT DOCUMENTS

| CN | 110299987 A * | 10/2019 | ............. H04L 9/008 |
| WO | WO-0169830 A2 * | 9/2001 | ............... A63H 3/28 |

(Continued)

OTHER PUBLICATIONS

"AHEad: Privacy-preserving online behavioural advertising using homomorphic encryption"; 2017 IEEE Workshop on Information Forensics and Security (WIFS) (pp. 1-6); Leon J. Helsloot • Gamze Tillem • Zekeriya Erkin; Dec. 1, 2017 (Year: 2017).*

(Continued)

*Primary Examiner* — John W Hayes
*Assistant Examiner* — Edgar R. Martinez-Hernandez
(74) *Attorney, Agent, or Firm* — Lewis Roca Rothgerber Christie LLP

(57) ABSTRACT

Method for online advertising auction on a peer-to-peer network includes: deploying a smart contract to publish a need from a consumer; receiving encrypted ad bids by the smart contract; storing the received ad bids in a hash function; reducing a number of ads that can be displayed by the consumer; transmitting the ad price to the consumer via the peer-to-peer computer network, when the hashed verification code is received from the consumer verifying that the consumer has viewed the ad content within an ad-viewing period of time; transmitting a difference between the advance payment and the ad price to the advertiser, by the smart contract via the peer-to-peer network; and ending the online advertising auction.

9 Claims, 21 Drawing Sheets

(51) Int. Cl.
| | |
|---|---|
| *H04L 9/32* | (2006.01) |
| *H04L 67/104* | (2022.01) |
| *H04L 9/30* | (2006.01) |
| *G06Q 20/22* | (2012.01) |
| *G06Q 20/02* | (2012.01) |
| *H04L 9/00* | (2022.01) |
| *H04L 9/40* | (2022.01) |

(52) U.S. Cl.
CPC ........... *G06Q 20/389* (2013.01); *H04L 9/008* (2013.01); *H04L 9/30* (2013.01); *H04L 9/3239* (2013.01); *H04L 9/3242* (2013.01); *H04L 63/0442* (2013.01); *H04L 63/123* (2013.01); *H04L 67/104* (2013.01); *G06Q 2220/00* (2013.01); *G06Q 2220/12* (2013.01); *H04L 9/50* (2022.05); *H04L 2209/56* (2013.01)

(58) Field of Classification Search
CPC ....... G06Q 2220/12; H04L 9/008; H04L 9/30; H04L 9/3239; H04L 9/3242; H04L 63/0442; H04L 63/123; H04L 67/104; H04L 2209/38; H04L 2209/56
See application file for complete search history.

(56) References Cited

U.S. PATENT DOCUMENTS

| | | | | |
|---|---|---|---|---|
| 10,706,118 | B1* | 7/2020 | Yang | H04N 21/4667 |
| 10,728,612 | B2* | 7/2020 | Lidow | H04N 21/6543 |
| 2009/0327141 | A1* | 12/2009 | Rabin | G06Q 30/0603 |
| | | | | 708/250 |
| 2011/0060688 | A1* | 3/2011 | Fernandez Gutierrez | ...... |
| | | | | G06Q 30/0277 |
| | | | | 705/55 |
| 2011/0288928 | A1* | 11/2011 | Patwa | G06Q 30/02 |
| | | | | 705/14.42 |
| 2011/0295752 | A1* | 12/2011 | Parkes | H04L 9/008 |
| | | | | 705/64 |
| 2013/0268374 | A1* | 10/2013 | Papineni | G06Q 30/02 |
| | | | | 705/14.71 |
| 2014/0244406 | A1* | 8/2014 | Garcia-Martinez | ...... |
| | | | | G06Q 30/0277 |
| | | | | 705/14.73 |
| 2014/0379492 | A1* | 12/2014 | Takata | G06Q 30/0275 |
| | | | | 705/14.71 |
| 2015/0161679 | A1* | 6/2015 | Tang | G06Q 30/0275 |
| | | | | 705/14.71 |
| 2015/0363835 | A1* | 12/2015 | Khan | G06Q 30/0275 |
| | | | | 705/14.71 |
| 2018/0268437 | A1* | 9/2018 | Nishikawa | G06Q 30/0251 |
| 2018/0300741 | A1* | 10/2018 | Leonard | G06Q 30/08 |
| 2020/0092084 | A1* | 3/2020 | Maroney | H04L 67/1008 |
| 2020/0118068 | A1* | 4/2020 | Turetsky | G06Q 30/018 |
| 2020/0272619 | A1* | 8/2020 | Alferov | G06Q 30/0246 |
| 2020/0279321 | A1* | 9/2020 | Wang | G06F 9/54 |
| 2020/0304421 | A1* | 9/2020 | Kamvar | G06Q 20/381 |
| 2020/0396065 | A1* | 12/2020 | Gutierrez-Sheris | ...... |
| | | | | H04L 9/3239 |
| 2022/0084013 | A1* | 3/2022 | Kulkarni | G06Q 20/389 |

FOREIGN PATENT DOCUMENTS

| | | | | |
|---|---|---|---|---|
| WO | WO-2008123677 | A1 * | 10/2008 | ............. G06Q 30/02 |
| WO | WO-2019155645 | A1 * | 8/2019 | |

OTHER PUBLICATIONS

"SAM: a flexible and secure auction architecture using trusted hardware"; Proceedings 15th International Parallel and Distributed Processing Symposium. IPDPS 2001 (pp. 1764-1773); A. Perrig • S. Smith • D. Song • J.D. Tygar; Jan. 1, 2001 (Year: 2001).*

"Auction mechanisms for network resource allocation"; 8th International Symposium on Modeling and Optimization in Mobile, Ad Hoc, and Wireless Networks (pp. 554-563); Koutsopoulos, I. • Iosifidis, G.; May 1, 2010 (Year: 2010).*

Paillier (1999), "Public-Key Cryptosystems Based on Composite Degree Residuosity Classes," J. Stern (Ed.), Eurocrypt'99, LNCS 1592, pp. 223-238.

* cited by examiner

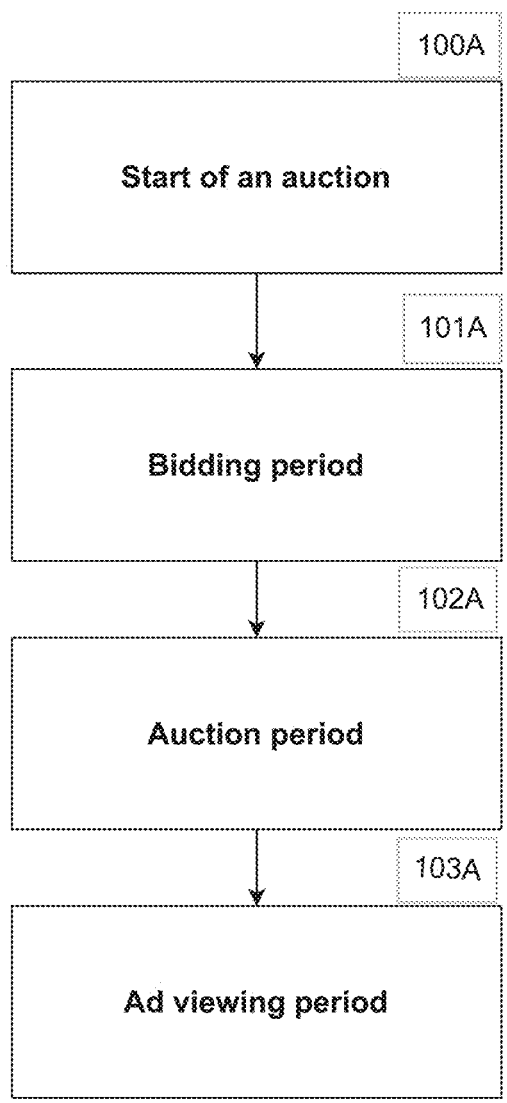

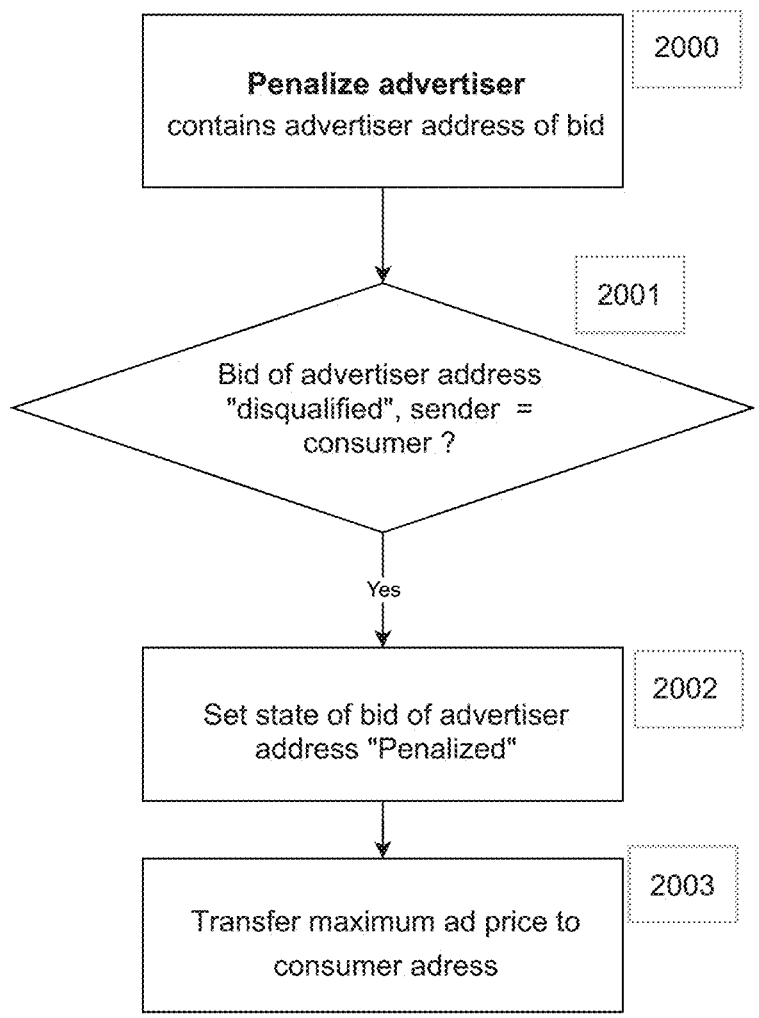

BLOCKCHAIN-BASED SYSTEM AND METHOD FOR PEER-TO-PEER ONLINE ADVERTISING AUCTION

CROSS-REFERENCE TO RELATED APPLICATIONS

This patent application claims the benefits of U.S. Provisional Patent Application Ser. No. 63/009,139, filed on Apr. 13, 2020, and entitled "Peer-To-Peer Online Advertising Auction System on a Blockchain Based on Paillier Homomorphic Encryption and Secure Multi-Party Computation," the entire content of which is hereby expressly incorporated by reference.

FIELD OF THE INVENTION

The disclosed invention relates generally to Blockchain-based software; and more particularly to Blockchain-based system and method for peer-to-peer online advertising auction.

BACKGROUND

Currently, intermediaries allocate online advertising. Digital platforms centrally auction advertising space on search engine, social media and other web sites based on the consumers' preferences they collect. This approach endangers privacy, leads to ad fatigue and is plagued with ad fraud.

SUMMARY

In some embodiments, the disclosed invention enables a consumer to directly specify her/his needs and to receive cryptocurrency or tokens for her/his attention from advertisers. It replaces the central auctioning of advertising space with two smart contracts that are executed by all nodes of a peer-to-peer network and auction and advertiser oracles. The auction smart contract stores and handles bids advertisers submit to get their ads displayed. The auction oracle is an external software that together with advertiser oracles determines the ad price the consumer receives when viewing an ad using a communication channel smart contract as secure communication channel. Cryptography is used to ensure that the advertisers' bids remain private despite the decentralized execution of the auction.

In some embodiments, the disclosed invention is a computer implemented method for a uniform price auction of online advertising on a peer-to-peer computer network. The method includes: deploying an auction smart contract to publish a need from a consumer; receiving encrypted ad bids by the smart contract from a plurality of advertisers; storing the received ad bids in a hash function mapped to the advertiser's address, wherein the stored ad bid includes a hash of the ad content encrypted with the consumer's public key, a hashed encrypted maximum bid price, a public key of the advertiser, and a hashed verification code, wherein the bid price is a maximum amount the advertiser is willing to pay the consumer for viewing the ad content; receiving an advance payment equal to the maximum ad price; reducing a number of ads that can be displayed by the consumer by increasing an ad price and eliminating ads with bid prices lower than the ad price; transmitting the ad price to the consumer via the peer-to-peer computer network, when the hashed verification code is received from the consumer verifying that the consumer has viewed the ad content within an ad-viewing period of time; transmitting a difference between the advance payment and the ad price to the advertiser, by the auction smart contract via the peer-to-peer computer network; and ending the uniform price auction of online advertising.

The ad bids may be encrypted using a Paillier encryption method. The auction smart contract may include a state-change function for checking whether the state of the smart contract needs to be changed.

In some embodiments, the method further includes storing the auction and communication channel smart contract at all nodes of the peer-to-peer computer network; executing a function of a smart contract by all nodes of the peer-to-peer computer network; and storing all transactions in a blockchain.

In some embodiments, the method further includes deploying a communication channel smart contract as a secure communication channel by the auction smart contract between the auction oracle and advertiser oracles, when the auction state is in an "Auction" state; setting a new ad price and comparing the new ad price to the bid prices to determine a number of ad bids with equal or higher bid prices; ending the auction, when the number of ad bids with higher bid prices is between a predetermined minimum and maximum number; and setting a different ad price and repeating setting a new ad price until an ad price with a number of ad bids with an equal or higher ad price between a predetermined minimum and maximum number is determined.

In some embodiments, the ad bid includes the following status: an Open status, where open ad bids are allowed be viewed during the ad-viewing period; an Outbid status, where the bid price of the ad bid is below the ad price; a Disqualified status, where the advertiser of the bid did not follow the auction protocol correctly; a Penalized status, where the consumer has claimed an advance payment of the disqualified bid; and an Advance Payment returned status, where the respective advertiser has reclaimed the advance payment.

BRIEF DESCRIPTION OF THE DRAWINGS

A more complete appreciation of the disclosed invention, and many of the attendant features and aspects thereof, will become more readily apparent as the disclosed invention becomes better understood by reference to the following detailed description when considered in conjunction with the accompanying drawings in which like reference symbols indicate like components.

FIG. 20 illustrates an exemplary process for penalizing advertisers by an auction smart contract, according to some embodiments of disclosed invention.

DETAILED DESCRIPTION

In some embodiments, the disclosed invention is directed to a computer network-implemented process for auctioning of online advertising by a consumer on a peer-to-peer network that ensures bid privacy. The process uses a uniform price auction to determine the ad price. A consumer initiates the method by publishing her/his need and an auction smart contract is created for handling ad bid submission, auction and ad viewing. Subsequently, advertisers send encrypted ads to the auction smart contract that are tailored to the need specified by the consumer. Together with an ad, an advertiser specifies her/his bid price, i.e. the maximum price she/he is willing to pay for the viewing of the ad.

To ensure bid privacy an advertiser encrypts he/his bid price and transmits it to the auction smart contract together with the public key used in the encryption. In order to enable an automatic payment, an advertiser provides the hash value of a verification code that the consumer has to provide to proof that she/he has viewed the ad, too. Thus, a complete ad bid transmission consists of an encrypted ad, and encrypted bid price, a public key and a hashed verification code. Together with an ad bid, an advertiser also transfers a preset maximum ad price to the auction smart contract as advance payment to guarantee payment when the consumer views the ad. The disclosed invention improves the online advertising, eCommerce, online privacy, among other technological areas.

Figure 1:
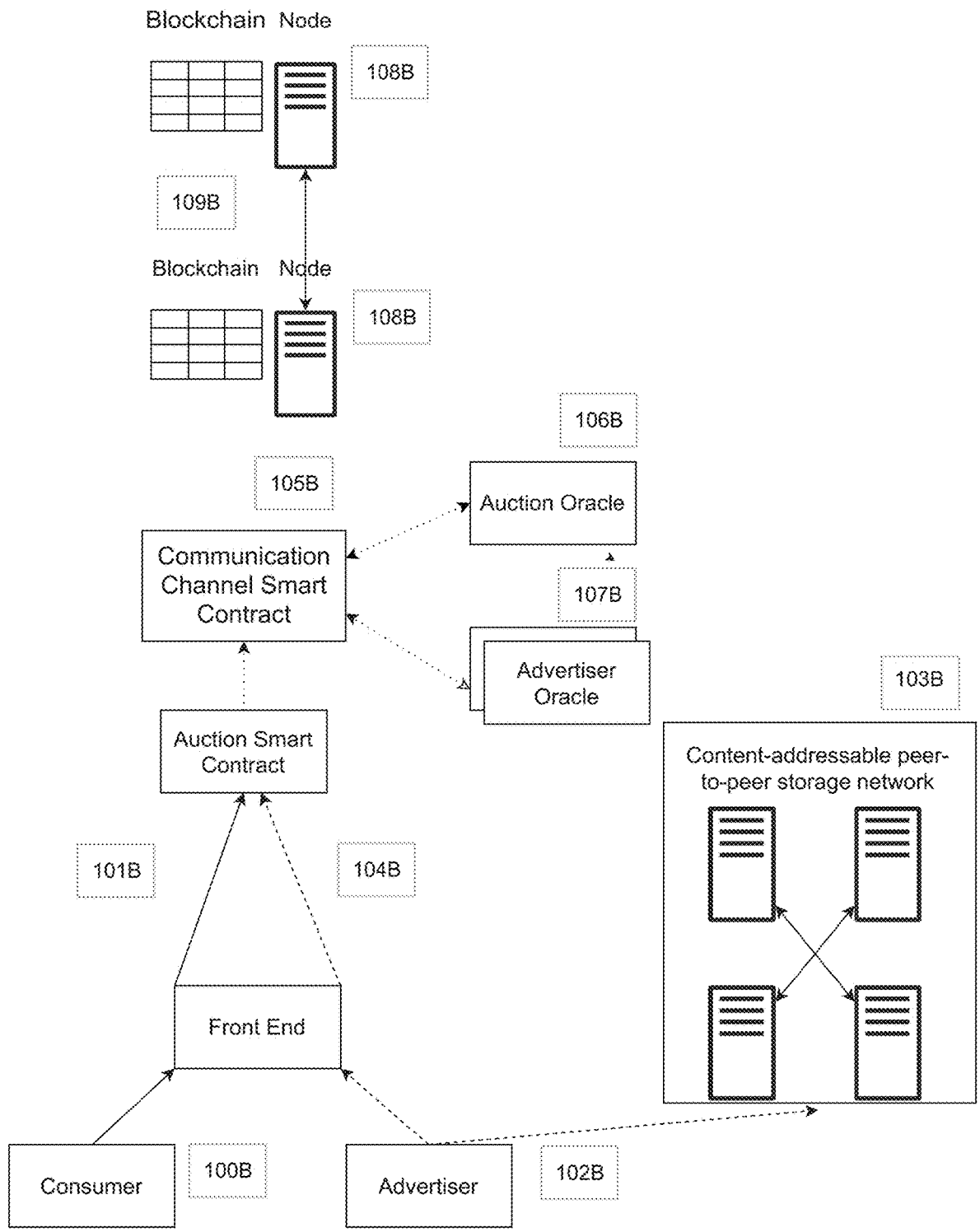
FIG. 1A illustrates an exemplary process overview, according to some embodiments of disclosed invention.
FIG. 1B depicts an exemplary peer-to-peer environment for a uniform price auction of online advertising, according to some embodiments of disclosed invention
Figure 2:
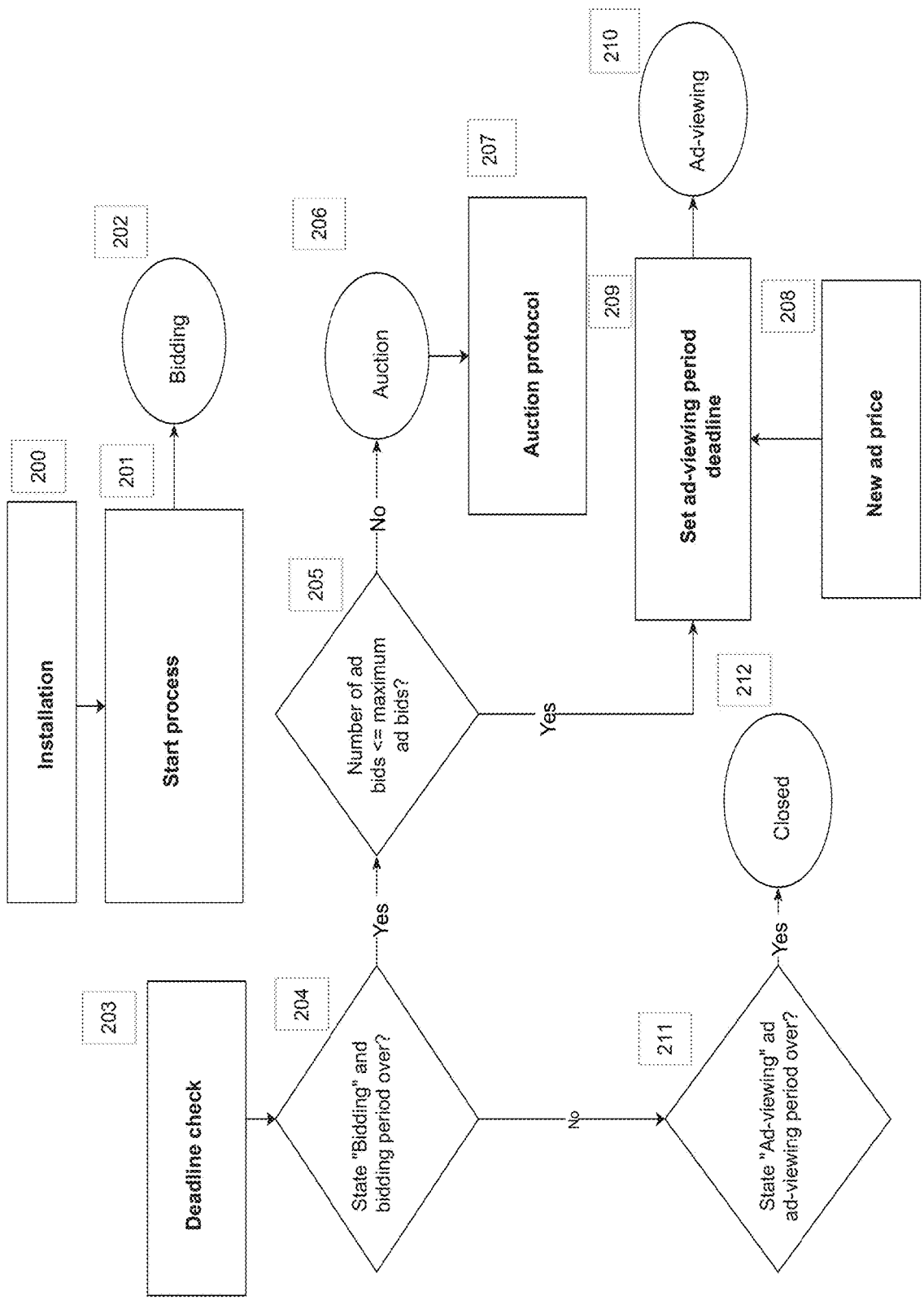
FIG. 2 shows a state diagram of an exemplary auction smart contract, according to some embodiments of disclosed invention.
Figure 3:
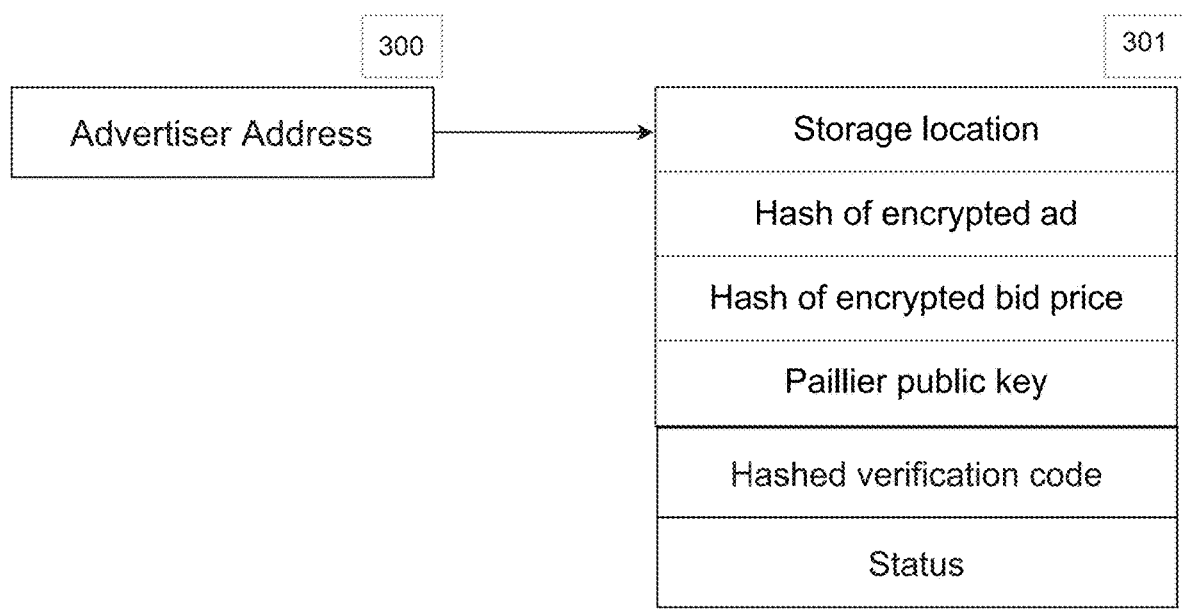
FIG. 3 depicts an exemplary bid hash function of the auction smart contract, according to some embodiments of disclosed invention.

FIG. 1A illustrates an exemplary process overview, according to some embodiments of disclosed invention. As shown, a consumer starts the process by deploying an auction smart contract to publish a need, in block 100A. FIG. 2 describes this process in more detail. The bidding period starts after the initialization. Advertisers then send (encrypted) ad bids and advance payments, which are received by the network in block 101A. Each encrypted ad bid from an advertiser includes an ad content and an address of the advertiser. FIG. 3 describes this process in more detail. The process state transitions to the auction period after the bidding period, in block 102A. In some embodiments, the ad price is a preset minimum value if the number of bids is below the maximum bid count threshold. The auction oracle (See, for example, FIG. 15) comes in to play otherwise and changes the ad price until the number of bids with bid prices equal or above the ad price is above the minimum bid count threshold and below the maximum bid count threshold. The consumer cannot view bids with bid prices lower than the new ad price and advertisers whose ad bids were overbid get their advance payment refunded after the ad-viewing period has ended.

The ad-viewing period starts after the ad price has been determined, in block 103A. An advertisement is considered to be viewed by a consumer, when the consumer submits a string as proof that she/he has viewed the ad the hash value of which matches the verification code of the respective ad bid. In such a case, the auction smart contract transfers an amount equal to the ad price to the consumer. Then it transfers the difference between the advance payment and the ad price to the advertiser of the respective ad bid. After the end of the ad-viewing period, advertisers with overbid or unviewed ads can reclaim their advance payments and the consumer can claim the advance payments of advertisers who did not follow the process correctly.

FIG. 1B depicts an exemplary peer-to-peer environment for auctioning of online advertising, according to some embodiments of disclosed invention. In some embodiments, the peer-to-peer environment includes frontend code, a content-addressable peer-to-peer storage network such as the distributed Merkle tree based IPFS, an auction smart contract, a communication channel smart contract, an auction oracle and advertiser oracles. As shown, a consumer 100B creates an auction smart contract 105B via a frontend user interface 101B by specifying the parameters as shown in FIG. 2. The consumer can also interact with the auction smart contract to:

view ads and provide respective proofs to collect the ad price (FIG. 18), and punish malicious advertisers by collecting their advance payments (FIG. 20).

Figure 19:
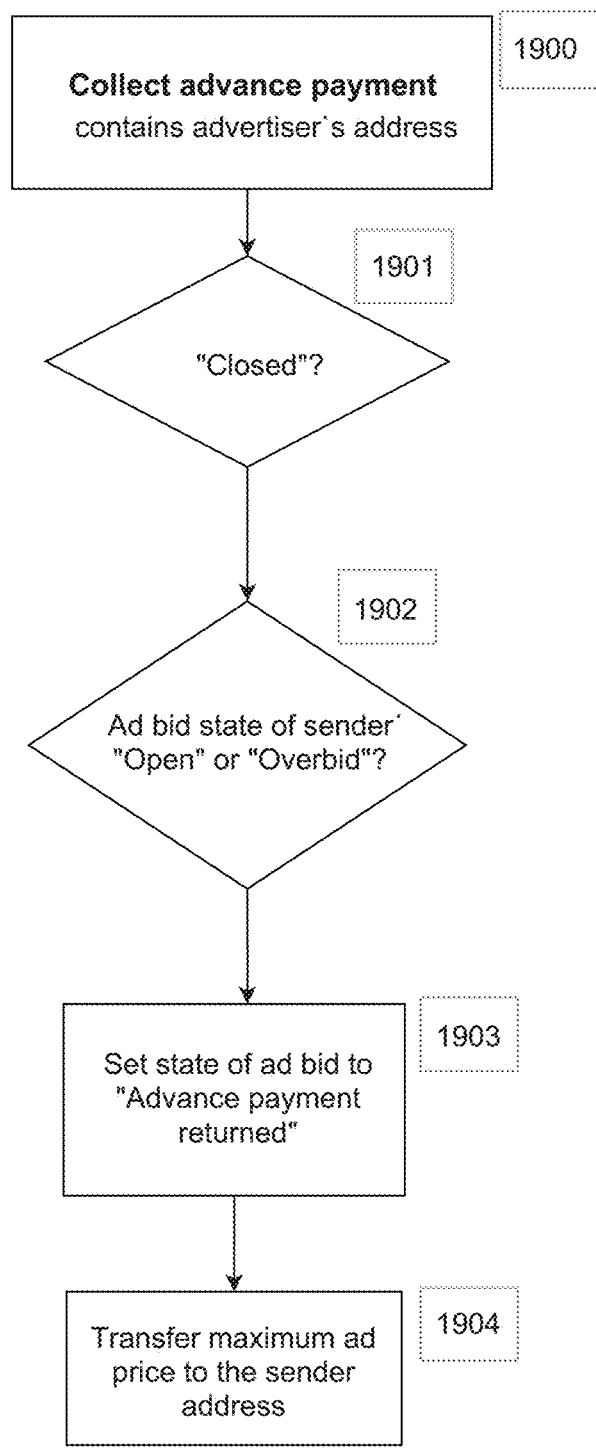
FIG. 19 depicts an exemplary process for collecting advance payment by an advertiser via the auction smart contract, according to some embodiments of disclosed invention.

An advertiser 102B, stores his/her encoded bid price and the ad to a content-addressable peer-to-peer storage network 103B. The content-addressable peer-to-peer storage network 103B then returns the storage address of the stored data as a hash, which is then be used alongside other parameters to submit a bid (FIG. 4) via the frontend 104B to an auction smart contract 105B. The advertiser can also use the auction smart contract to collect her/his unused advance payment (FIG. 19). A node of the content-addressable peer-to-peer storage network 103B, such as a computer, is used to store and retrieve encoded bid prices and ads. A user in such a content-addressable peer-to-peer storage network network can serve a file by its content address, and a distributed hash table is employed to find and request content.

Figure 15:
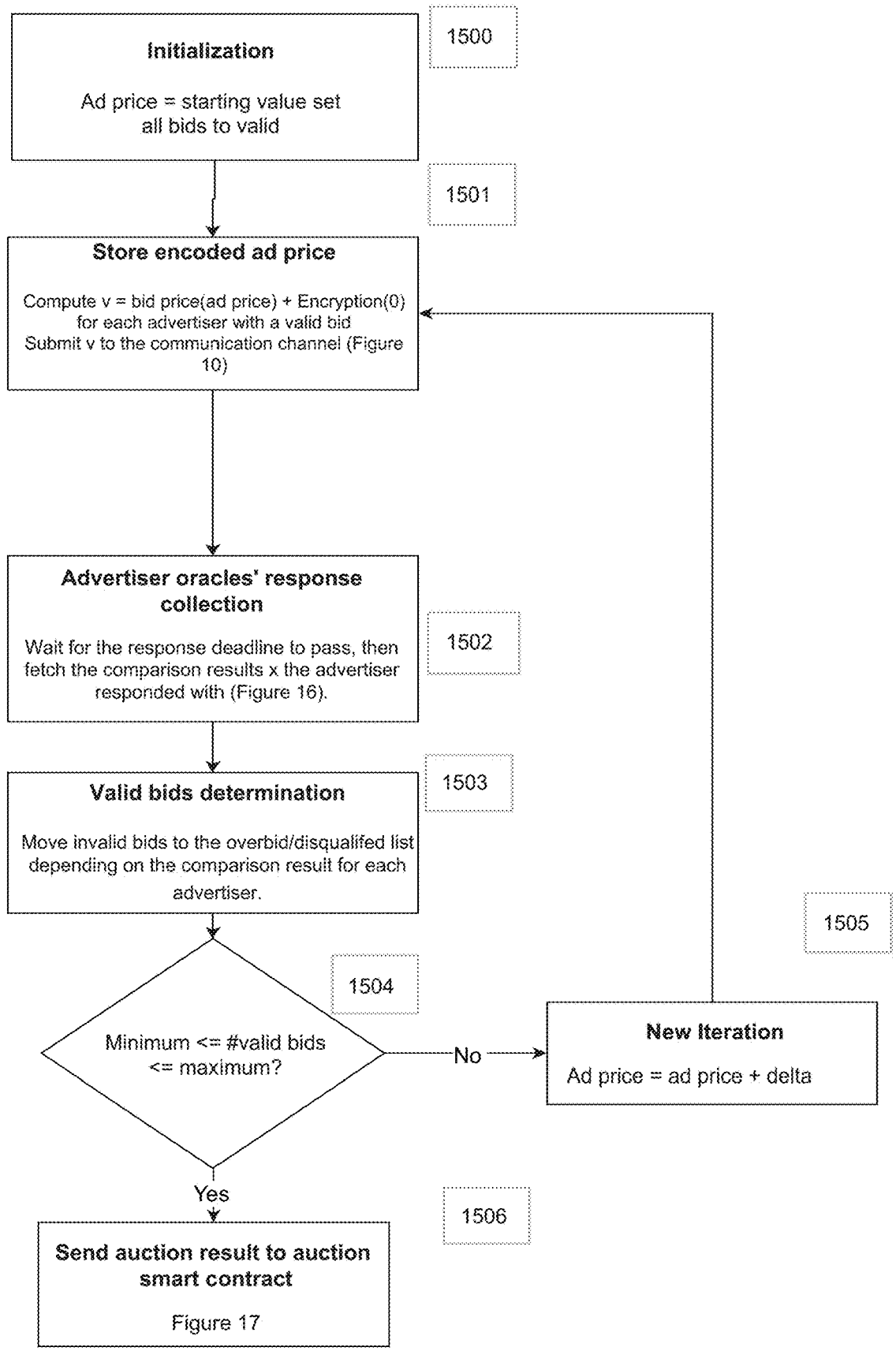
FIG. 15 depicts an exemplary process for an auction oracle, according to some embodiments of disclosed invention.

A communication channel smart contract 106B is created by the auction smart contract 105B when the number of ad bids is above the maximum bid count threshold. An auction is initiated to reduce the number of ads available for the consumer (see FIG. 7). This smart contract is used as secure communication channel between the auction oracle 107B and the advertiser oracles 108B. The auction oracle 107B iteratively sends an encrypted ad price to the communication channel smart contract 106B, and checks the encrypted response of the advertiser oracles to see whether the bid prices of the respective advertisers are equal, above or below the ad price (FIG. 15).

A node is a processing node of a blockchain peer-to-peer network 109B, such as a computer. Each node of the blockchain peer-to-peer network stores a copy of the blockchain and a shared state, and runs a virtual machine to execute an auction and a communication channel smart contract. In some embodiments, the blockchain 110B is a transaction-based state machine. Beginning with a "genesis state," this genesis state transitions into some final state when the transactions submitted by consumers and advertisers are executed. In some embodiments, the transactions are grouped into "blocks", and each block is chained together with its previous block. Miners are able to validate and add new blocks to the chain in a mining process, which ensures that nodes are compensated for their effort and that the versions of the blockchain are synchronized between all nodes in the network (110B).

In some embodiments, the transactions are initiated by accounts that are able to interact with one another through a message-passing framework. Each account has a state and an address, and the world state is a mapping between addresses and states of accounts. There are two types of accounts, externally owned accounts (EOA), which are controlled by private keys and have no code associated with them, and contract accounts, which are controlled by their contract code and have code associated with them. Both types of accounts have the balance in cryptocurrency or tokens as part of their state, and for an EOA the address of the account is derived from the public key that was created from the private key when setting up the account.

In some embodiments, the consumers 100B and advertisers 102B have EOAs. When a consumer or advertiser has signed a transaction with her/his private key, everyone can verify from the address of the respective account, i.e. the public key, that the consumer/advertiser is the owner of the respective account. It also is proofed that the account owner has authorized the spending of cryptocurrency or tokens or the execution of a smart contract and that the transaction data has not been modified by anyone after the transaction has been signed. Consumers and advertisers use a wallet to hold their keys and connect to the peer-to-peer network.

The virtual machine of a node (109B) is an emulation of a computer system which executes smart contracts. A smart contract consists of a number of immutably stored instructions, and the corresponding transactions are executed recursively, computing the shared state and the internal state of the virtual machine. When a consumer formulates her/his need and deploys an auction smart contract 105B in the network, she/he receives the contract's address. At this address, an immutable hash of the smart contract code is stored in the contract account state, together with the current version of the contract variables, the balance of the contract and the number of transactions sent from the contract.

FIG. 2 shows a state diagram of an exemplary auction smart contract, according to some embodiments of disclosed invention. As shown, the consumer deploys the auction smart contract, in block 200. In some embodiments, the consumer provides all of the following parameters:
  the address and the public key of the consumer,
  the address of the auction oracle,
  the hashed need of the consumer (product type, the country they reside in, special notes, etc.),
  the maximum and the minimum bid count threshold,
  the duration of the bidding period,
  the duration of the ad-viewing period, and
  the minimum and maximum ad price.

The state is initialized in block 201 and then transitions to a "Bidding" state after the initialization, in block 202. The "Bidding" state allows advertisers to bid for their tailored advertisement. A deadline check is carried out at the beginning of every function call, in block 203. If the bidding phase is over (block 204) and the number of bids is below the maximum threshold, an "Ad-viewing" state is initiated, in block 209. Otherwise, an auction oracle (see, e.g., FIG. 15) needs to step in. The state gets changed to an "Auction" state, in block 206 and a communication channel contract (see, e.g., FIG. 8) is deployed, in block 207. This deployment is explained in more detail, in FIG. 7. The auction smart contract then proceeds to the ad-viewing period, once the new ad price has been determined by the auction oracle in block 210. The "Ad-viewing" state allows the consumer to view the advertisements. This process is explained in more detail, in FIG. 18. After the ad-viewing period is over (block 211), the state is changed to a "Closed" state, in block 212.

In some embodiments, advertisers can only place ad bids during a certain bidding period. If the number of ad bids received during the bidding period is equal or less than a preset maximum, the ad viewing period starts. During this time period the consumer can view all submitted ads and receives a preset minimum ad price for each verified view from the advance payment of the respective advertiser by the auction smart contract. At the end of the ad viewing period, advertisers may reclaim any advance payments not used.

This way, if the number of ad bids received during the bidding period is above the preset maximum, the auction smart contract will initiate an auction. An auction oracle increases the minimum ad price and checks to see if the number of ad bids with a bid price equal or above the new ad price is above a preset minimum and below a preset maximum. If this is the case, the auction smart contract starts the ad viewing period, but now only those ads whose bid price is equal to or higher than the new ad price can be viewed, and the consumer receives the new ad price when proofing that he viewed an ad. Otherwise, the auction oracle will attempt a new ad price until it finds an ad price where the number of ad bids with bid prices equal to or higher than the new price is between the specified upper and lower limits.

FIG. 3 depicts an exemplary bid hash function of the auction smart contract, according to some embodiments of disclosed invention. As shown, the ad bids submitted by the advertisers with the advertiser's address 300 are stored in a hash function 301 with certain storage locations. An ad bid is mapped to its bidder address (advertiser) and contains the following data:
  The hash of the advertisement encrypted with the consumer's public key, The hashed encrypted maximum bid price (created, e.g., in FIG. 5), The Paillier public key of the advertiser (created, e.g., in FIG. 4), The hashed verification code the consumer has to produce to prove that she/he has viewed the advertisement, and The status of the bid (open, overbid, disqualified, viewed, penalized, advance payment returned).

The status of an ad bid may be:

Open: The default status. Open bids can be viewed during the ad-viewing period.

Overbid: The bid price of this bid is below the ad price. Set, e.g., according to FIG. 17. The bidder of this bid can collect his/her advance payment.

Disqualified: The bidder of this bid has been dishonest during the determination of the new ad price. Set, e.g., according to FIG. 17. The consumer can claim the advance payment submitted by the advertiser.

Inspected: The consumer proved that he/she has viewed the advertisement by providing the associated verification code. The consumer has collected the ad price and the bidder of this bid received the difference between advance payment and ad price. Set, e.g., according to FIG. 18.

Penalized: The consumer has claimed the advance payment of a "Disqualified" bid. Set, e.g., according to FIG. 20.

Advance payment returned: The advance payment has been reclaimed by its advertiser. Set, e.g., according to FIG. 19.

Figure 4:
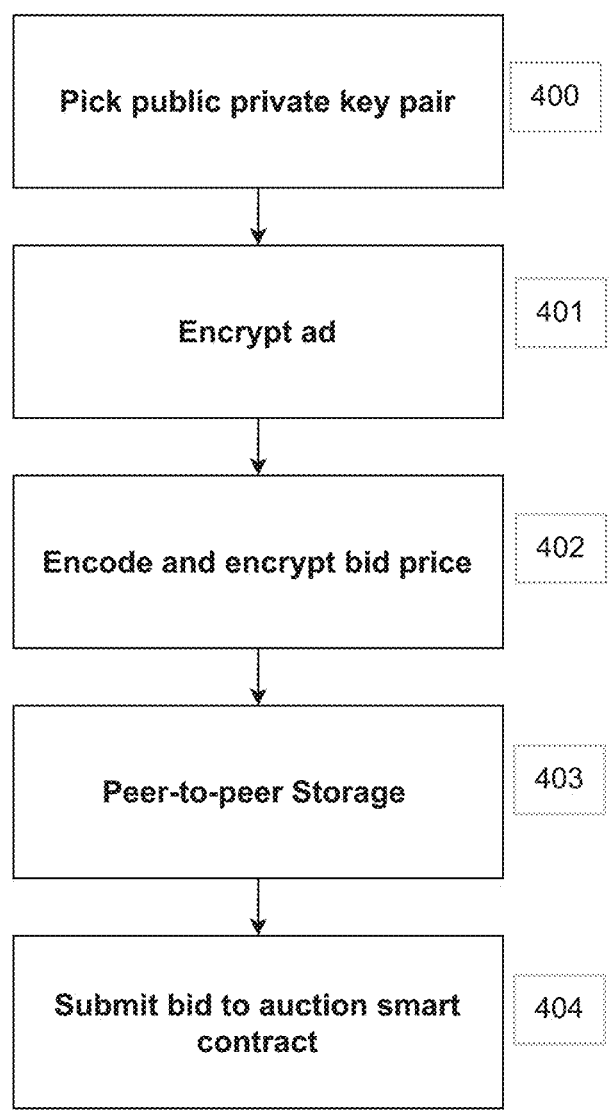
FIG. 4 shows an exemplary bid submission process, according to some embodiments of disclosed invention.

FIG. 4 shows an exemplary bid submission process, according to some embodiments of disclosed invention. As shown in block 400, the advertiser picks a public-private key pair. In some embodiments, the public-private key pair is selected based on the Paillier encryption method. For example, the advertiser chooses two large prime numbers p and q randomly of equal length and sets n=pq, g=n+1, $\lambda=\varphi(n)$, and $\mu=\varphi(n)^{-1}$ mod n, where $\varphi(n)=(p-1)(q-1)$. The public (encryption) key is set to (n, g) and the private (decryption) key is set to $(\lambda,\mu)$.

The ad is then encoded with the public key of the consumer, in block 401. The bid prices are encoded (for example, with the Paillier private key) in block 402, as described further in FIG. 5. Subsequently, the resulting vector is stored in a content-addressable peer-to-peer storage network, in block 403. Then, the hash of the ad encrypted with the public key of the consumer, the hash of the encrypted bid price, her/his Paillier public key and the hashed verification code is submitted to an auction smart contract to be stored in the hash table of ad bid, in block 404, as described further in FIG. 6.

Figure 5:
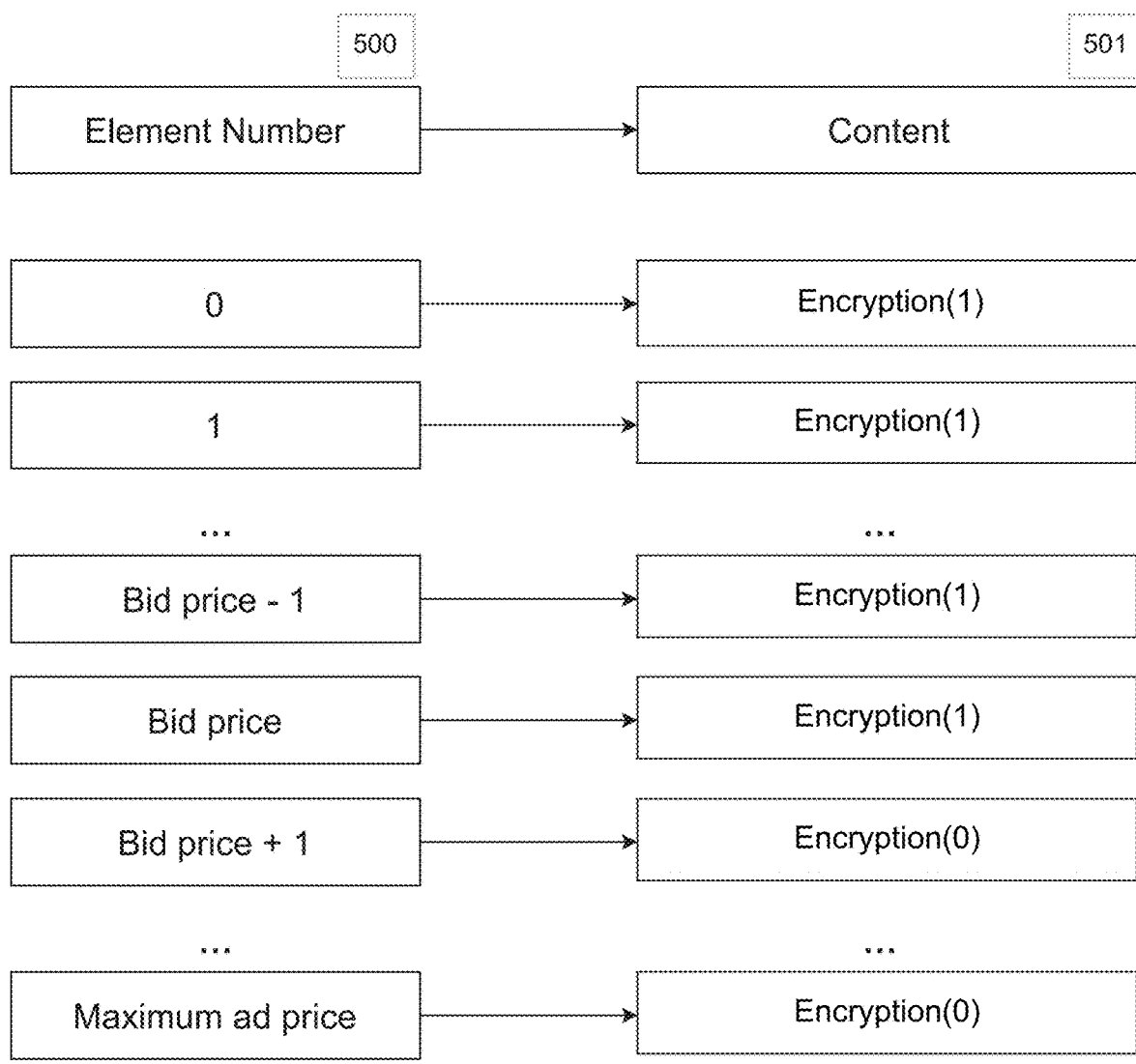
FIG. 5 illustrates an exemplary data structure for a bid price, according to some embodiments of disclosed invention.

FIG. 5 illustrates an exemplary data structure for a bid price, according to some embodiments of disclosed invention. As shown, a vector (block 500) of encrypted 0s and 1s of length (0, . . . , maximum bid price) is created, where elements 0 to bid price are set to encrypted 1s and elements bid price+1 to maximum ad price are set to encrypted 0s. Encryption is performed with the advertiser's private (Paillier) key (n,g), where 0s are encrypted by computing $c=r^n$ mod $n^2$, with random r, and 1s are encrypted by computing $c=g \cdot r^n$ mod $n^2$, with random r (block 501).

Figure 6:
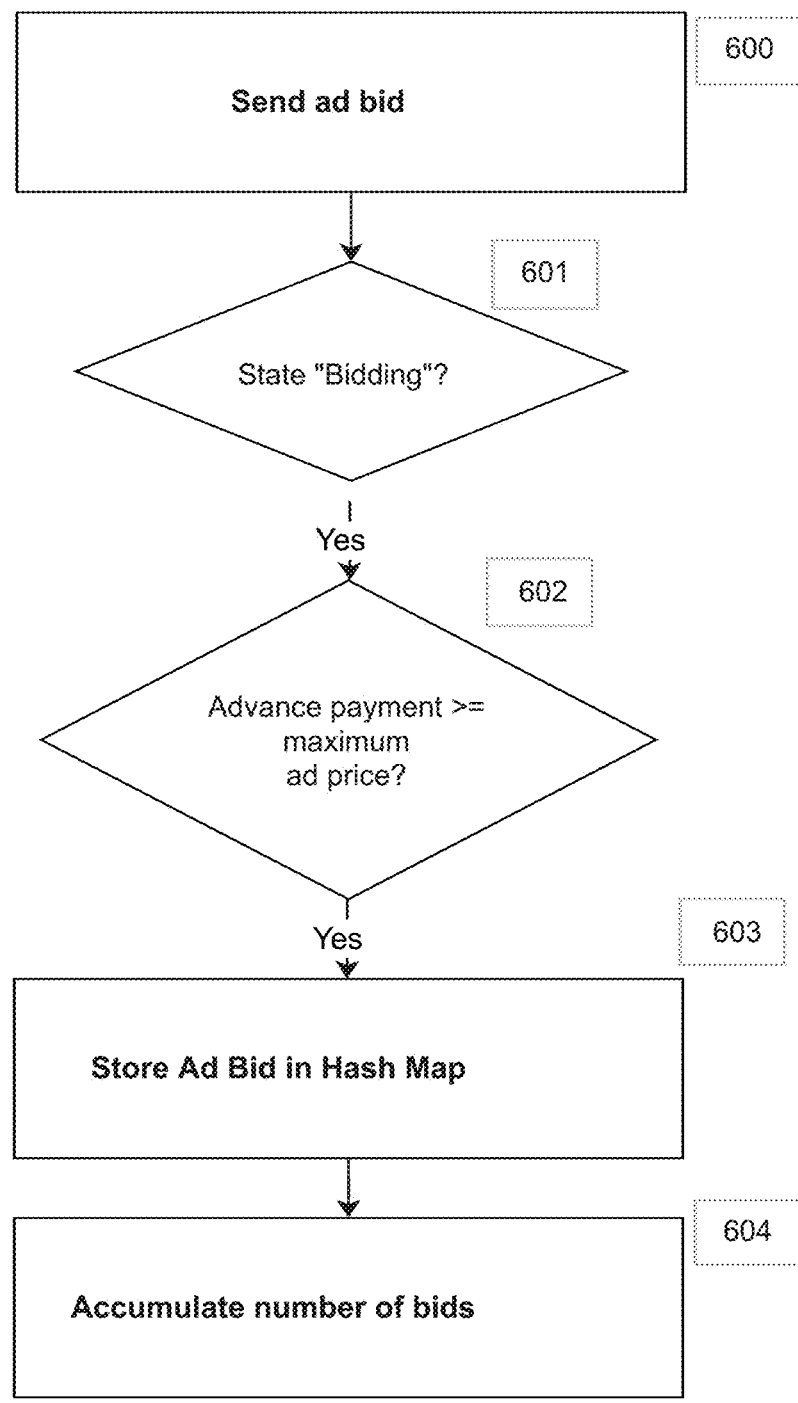
FIG. 6 depicts an exemplary process of a bid function for the auction smart contract, according to some embodiments of disclosed invention.

FIG. 6 depicts an exemplary process of a bid function for the auction smart contract, according to some embodiments of disclosed invention. In block 600, the advertiser submits a bid using the following parameters:

The hashed encrypted advertisement,

The hashed encrypted bid price,

The Paillier public key,

The hashed verification code, and

An advance payment equal to the preset maximum ad price.

If the state is in the "Bidding" state (block 601) and the advertiser sends an advance payment equal to the maximum ad price (block 602), the auction smart contracts creates a new entry in the bid hash function in block 603 (as described with respect to FIG. 3). The new entry includes the function parameters and the status "Open" and is mapped to the address of the advertiser who submitted the bid. The number of bids is then incremented by 1, in block 604.

On a peer-to-peer network, every node of the network executes a smart contract, and all variables, value transfers, and account balances are visible to every member of the network. Special arrangements are therefore needed to ensure that the bid prices remain private and only the fact that an ad bid has a bid price above the final ad price is publicly revealed. In some embodiments, the Paillier cryptosystem is utilized to achieve this privacy. The Paillier cryptosystem is a probabilistic asymmetric algorithm for public key cryptography that exhibits additive homomorphism, i.e., given only the public key and the encryption of $m_1$ and $m_2$, one can compute the encryption of $m_1+m_2$ as:

$$D(E(m_1,r_1) \cdot E(m_2,r_2) \bmod n^2)=m_1+m_2 \bmod n$$

where $D(.)$ denotes decryption, $E(.)$ encryption and $r_1$ and $r_2$ are random numbers.

The public (encryption) key (n,g) and the private (decryption) key $(\lambda,\mu)$ are set as follows: Choose two large prime numbers p and q randomly of equal length and set n=pq, g=n+1, $\lambda=\varphi(n)$, and $\mu=\varphi(n)^{-1}$ mod n, where $\varphi(n)=(p-1)(q-1)$. Encryption of message m is done by computing $c=g^m \cdot r^n$ mod $n^2$, with random r. Decryption of ciphertext c is achieved via $m=L(c^\lambda \bmod n^2) \cdot \mu \bmod n$ with $L(x)=(x-1)/n$.

In some embodiments, a bid price is limited to integer values between 0 and a preset maximum ad price. When submitting a bid, an advertiser has to transfer the maximum ad price as advance payment to guarantee payment. In addition, a Paillier key pair is created as described above and the advertiser's bid price is encoded by encrypting values below or equal her/his bid price with 1 and values above the bid price with 0.

This encoding of a bid price can result in a long vector. Moreover, in order to make a Paillier encryption scheme safe, n is selected to be either 2048 or 3072 bit long so that each cell of the vector contains a large number. Storing this information directly in a smart contract would be costly, as each node receives a size dependent fee when executing a smart contract. Instead, the encoded bid price is stored in a content-addressable peer-to-peer storage network. distributed file system like the InterPlanetary File System (IPFS) and only transfers the returned hash-value to the auction smart contract. The IPFS is a protocol and peer-to-peer network for storing and sharing data in a distributed file system. IPFS uses content-addressing to uniquely identify each file in a global namespace connecting all computing devices.

In some embodiments, the comparison of bid prices and ad prices is performed by an auction oracle. Upon initialization, this oracle creates an asymmetric key pair with any asymmetric encryption method and publishes its public key in the auction smart contract so that all advertisers can retrieve it. Then, the oracle initiates a secure multiparty computation with advertiser oracles, which compares the bid prices of all ad bids received to various ad prices until a valid number of ad bids is found. When comparing a given ad price p to an encoded bid price b, the auction oracle uses the hash-value stored in the ad bid to retrieve the vector b encoding the bid price from the content-addressable peer-to-peer storage network. Then it extracts the ciphertext stored in position p of b to obtain b[p]. Using the advertiser's Paillier public key (n,g) it then multiplies this value with the Paillier encryption of 0 to obtain v=b[p]. $r'' \mod n^2$, and sends v to the advertiser oracle.

Due to the homomorphic property of the Paillier cryptosystem, this corresponds to the addition of 0 to the original value b[p]. Thus, v corresponds to the element of the encrypted bid price vector at the ad price position. On receiving v by the advertiser, v is decrypted with the advertiser's private (Paillier) key and the comparison result indicates a "1" if the bid price is higher or equal to the ad price p, and a "0," otherwise. A random string is then concatenated to the result. The result is then encrypted with the public key of the auction oracle, which is stored in the auction smart contract. The resulting ciphertext x is then transferred to the auction oracle. On receipt, the auction oracle decrypts x using its private key, extracts the first digit and by adding all comparison results, it determines the number of ad bids with a bid price equal to or higher than the specified ad price p.

Figure 7:
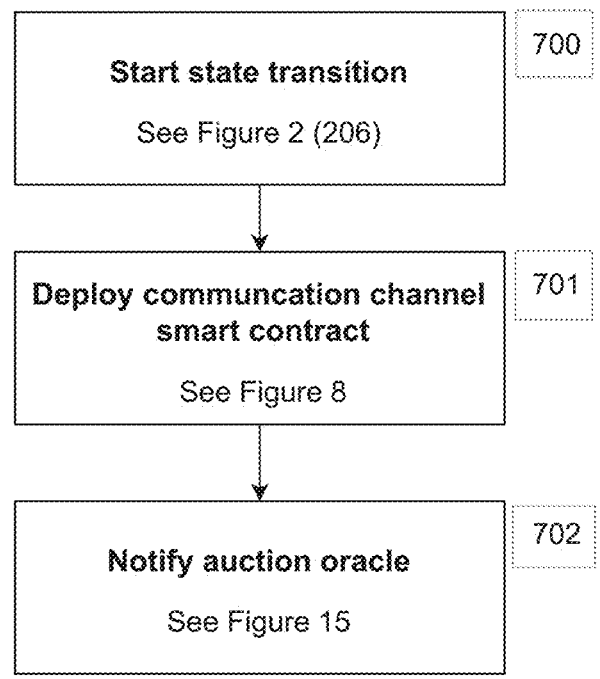
FIG. 7 shows an exemplary process for a state transition to an "Auction" state in the auction smart contract, according to some embodiments of disclosed invention.

FIG. 7 shows an exemplary process for a state transition to an "Auction" state in the auction smart contract, according to some embodiments of disclosed invention. The state transition 700 occurs in block 206 of FIG. 2. If the number of bids submitted has exceeded the maximum bid count threshold (block 205, in FIG. 2), it needs to be reduced so that it lies between a minimum threshold and the maximum threshold by raising the ad price. The status of bids with a bid price below the new ad price are set to "Overbid". The consumer cannot view ads with ad bid status "Overbid" during the ad-viewing period.

This process requires a secure multiparty computation involving the auction oracle and the advertiser oracle of each bid. The auction oracle broadcasts new ad prices, and the advertiser oracles reply whether their bid price is above or below it (see, for example, FIG. 8 for an overview). A secure communication channel is deployed as a communication channel smart contract and its address is stored in the auction smart contract as a reference, in block 701. The auction smart contract notifies the auction oracle about the new channel in the form of an event, in block 702.

In order to guarantee secure and traceable communication between the advertiser oracles and the auction oracle and to prevent malicious behavior by the auction oracle, the auction smart contract deploys a communication channel smart contract at the beginning of the auction period to handle the value exchange between the auction oracle and the advertiser oracles. The communication channel smart contract stores a hash table that for each ad price p tried contains the encrypted elements of the bid price vector at the ad price position v supplied by the auction oracle for each advertiser and the encrypted comparison results x supplied by each advertiser oracle in response. To prevent strategic behavior of advertisers, only hash values of the ad prices tried out are stored during an active auction. After the end of an auction, the auction oracle publishes a hash table that relates the hash values to the actual ad prices and random seeds used so that the advertisers can supervise its behavior. On this basis, advertisers with bid prices above the final ad price that are in the set of losing bidders can reveal incorrect behavior of the auction oracle by showing the correct encryption of their bid price and their responses to all ad prices tried out in the mapping that stores the protocol history. Analogously, advertisers with bid prices below the final ad price that are in the set of winning bidders can object the auction result.

Figure 8:
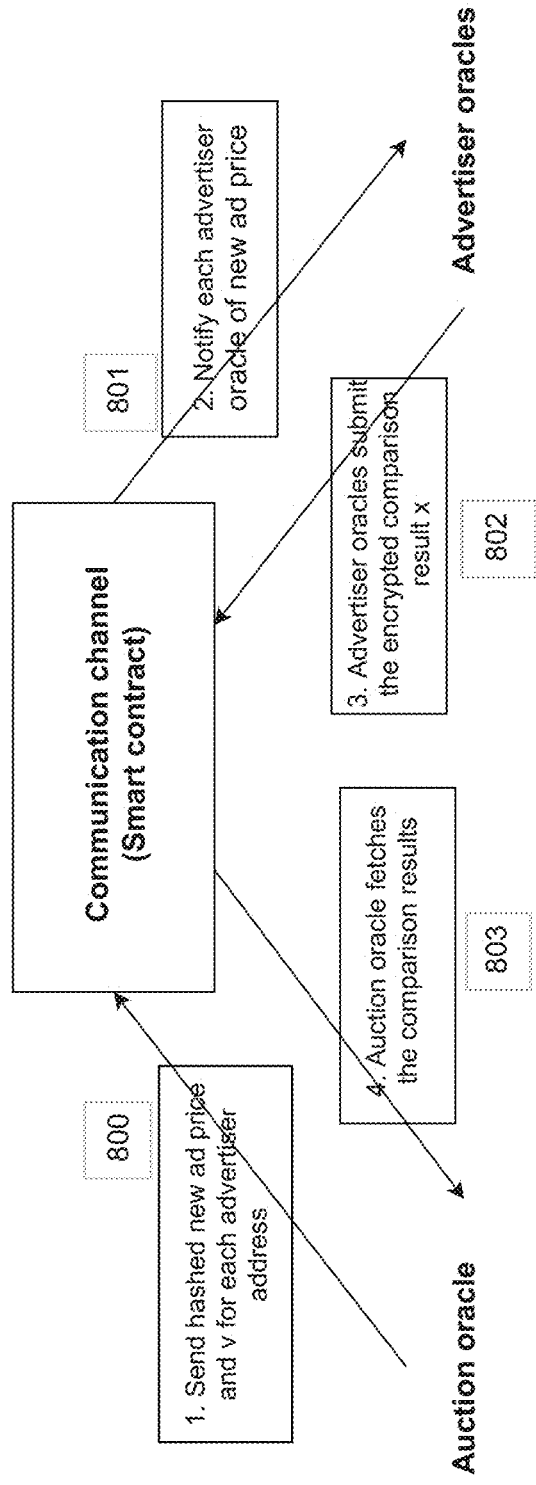
FIG. 8 shows an exemplary process for communication between an auction oracle and advertiser oracles, according to some embodiments of disclosed invention.
Figure 9:
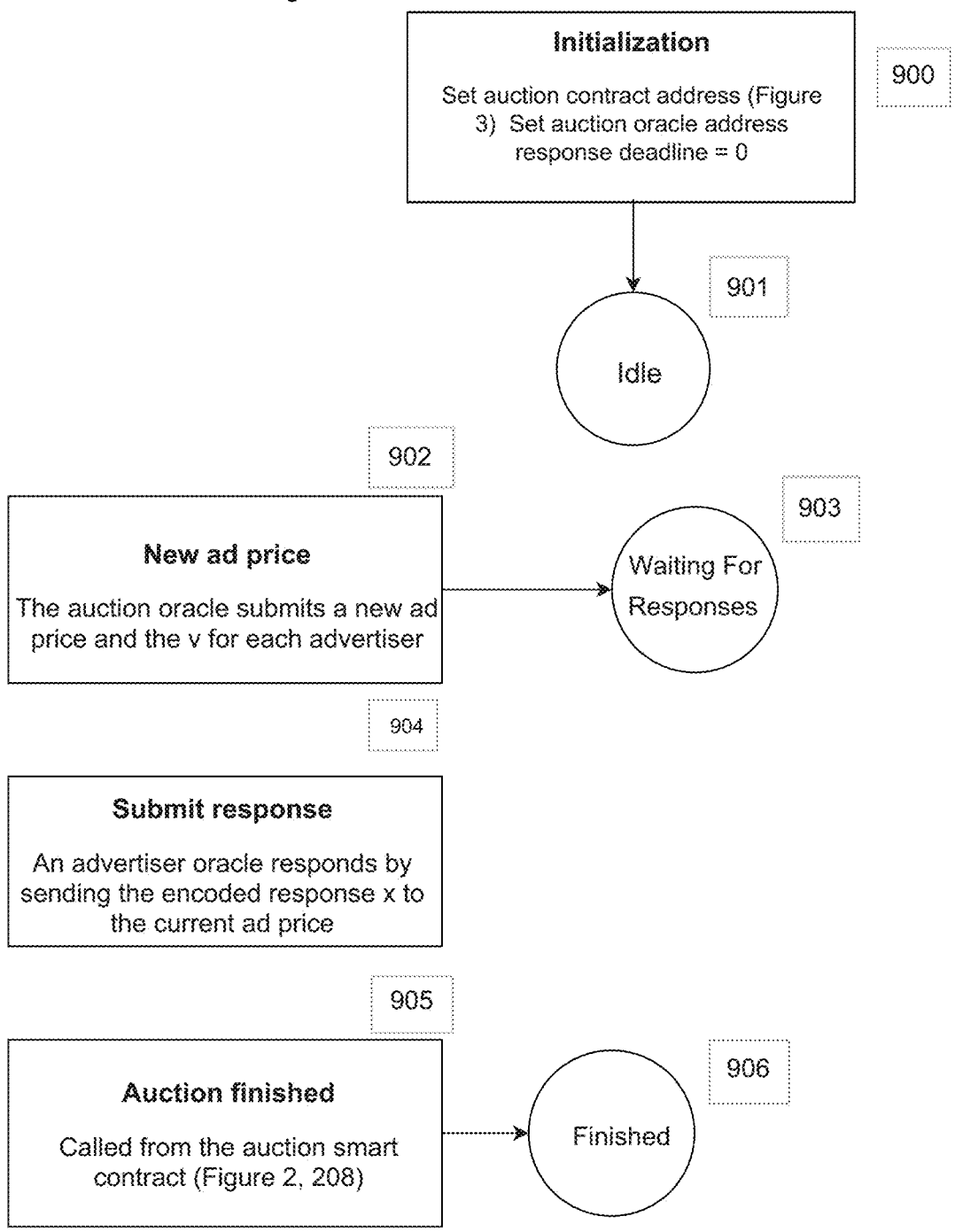
FIG. 9 depicts an exemplary state diagram for a communication channel for an auction smart contract, according to some embodiments of disclosed invention.

FIG. 8 shows an exemplary process for communication between an auction oracle and an advertiser oracle, according to some embodiments of disclosed invention. The communication channel for the auction smart contract allows a decentralized communication. The auction oracle (FIG. 15) starts the protocol by submitting a new ad price to the communication channel in block 800. The advertiser oracles are notified in block 801 and respond by sending to the communication channel whether the new ad price is above equal or below their bid price in block 802. The auction oracle collects the answers after a set deadline in block 803. This process is repeated until the number of ad bids with bid prices equal or above the ad price is above the minimum and below the maximum bid count threshold (FIG. 15). FIG. 9 depicts an exemplary state diagram for a communication channel for an auction smart contract, according to some embodiments of disclosed invention. The auction smart contract deploys the communication channel smart contract when the state of the auction smart contract (FIG. 2) transitions to the "Auction" state (FIG. 7). In block 900, the communication channel smart contract is initialized with:

The address of the auction smart contract that deployed this smart contract,

The address of the auction oracle, and

The response time the advertiser oracles have to submit their replies.

The state is set to "Idle" until the first ad price submission by the auction oracle, in block 901. In block 903, the state changes to "Waiting for responses," after a new ad price submission by the auction oracle in block 902. In block 904, the advertiser oracles' answers have to be submitted the response deadline. The auction smart contract changes the state to "Finished" state, in block 905, after the auction oracle has submitted the auction results (e.g., FIG. 2, block 210). The process is then completed in block 906.

Figure 10:
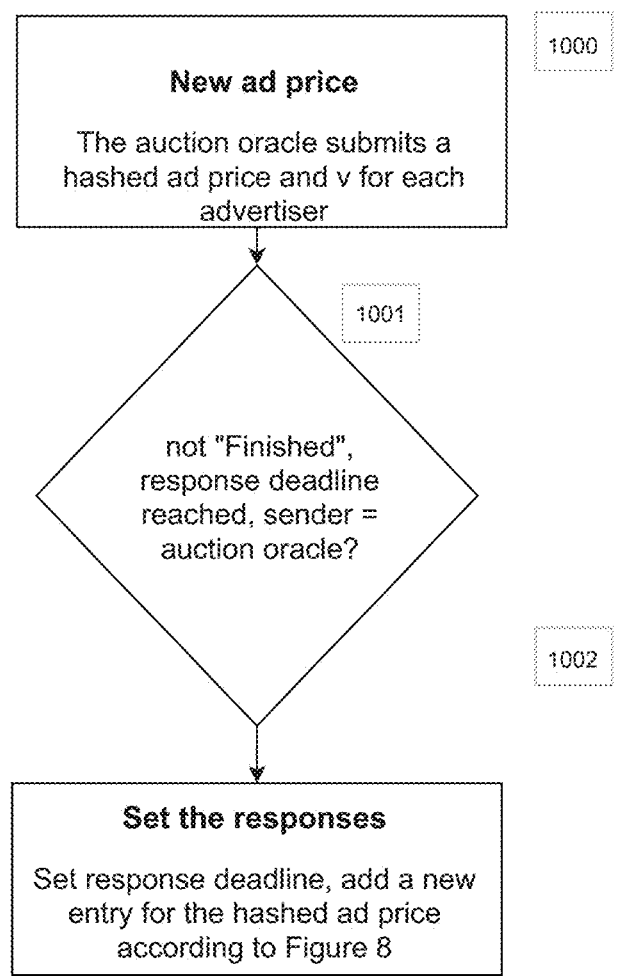
FIG. 10 shows an exemplary process for submitting a new ad price to the advertisers by an auction oracle, according to some embodiments of disclosed invention.

FIG. 10 shows an exemplary process for submitting a new ad price to the advertiser oracles by an auction oracle, according to some embodiments of disclosed invention. As shown in block 1000, an auction oracle submits a new (hashed) ad price and a v for each advertiser. The sender address needs to be the auction oracle address. The state is not "Finished" and the current response deadline needs to have been reached, in the decision block 1001. This prevents the overlapping of new ad price submissions. The response deadline is initially 0 to always allow the first submission. In block 1002, a response deadline is set, a new entry for hashed ad prices is added (see, e.g., FIG. 8), and the provided hashed new ad price and the encoded bid prices for each bid are stored in a storage medium, as described in FIG. 13. An event is logged to notify the advertisers of the new ad price and the state is changed to "Waiting for Responses" (see FIG. 9, block 903).

In a "semi-honest" case, in which both the auction oracle and the advertisers adhere to the prescribed protocol, the willingness to pay (bid price) of an advertiser is not disclosed towards the auction smart contract and other advertisers beyond the fact that it is above or below the ad price. The auction oracle learns more about bid prices if more than one ad price is tried out, though. However, this information cannot be used to manipulate auctions, since it is not possible to place or modify bids during the auction period and the minimum ad price is preset in the auction smart contract. Nevertheless, advertisers should use different keys in different auctions to obfuscate their bidding strategies.

Figure 11:
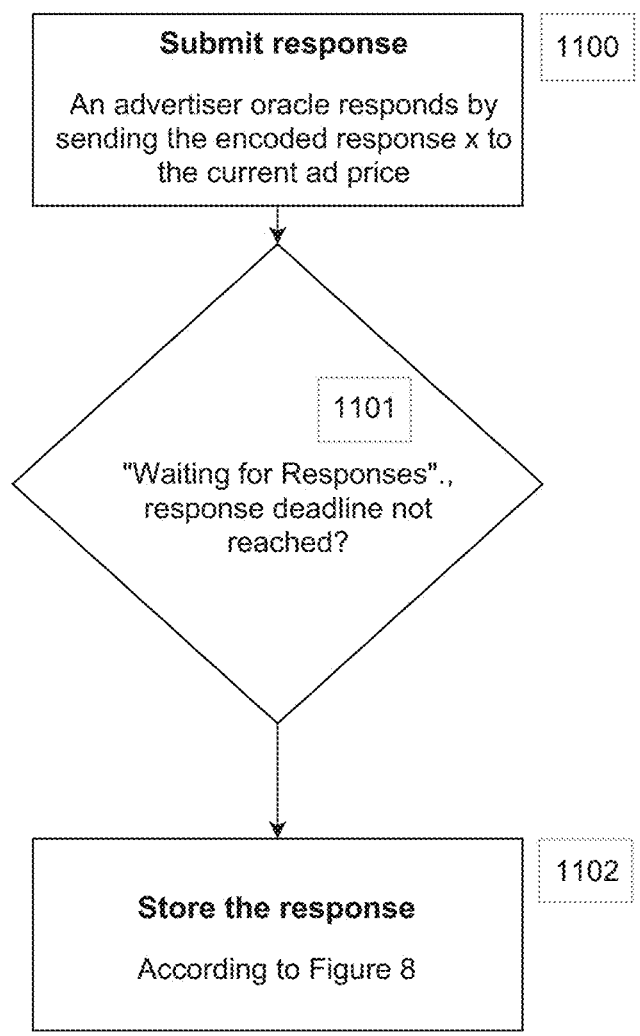
FIG. 11 illustrates an exemplary process for submitting a response by an advertiser oracle to a communication channel smart contract, according to some embodiments of disclosed invention.

FIG. 11 illustrates an exemplary process for submitting a response by an auction oracle to a communication channel smart contract, according to some embodiments of disclosed invention. As depicted, a sender address submits a bid in the associated auction smart contract by sending the encoded response x to the current ad price, in block 1100. In block 1101 it is checked whether the state is "Waiting for Responses" and the response deadline has not been reached. The response submission of the sender address is then mapped to the hash function depicted in FIG. 13 as:

[Current hashed ad price]=>[Advertisers]=>[Advertiser address]=>Comparison Result, and stored in block 1102.

Figure 12:
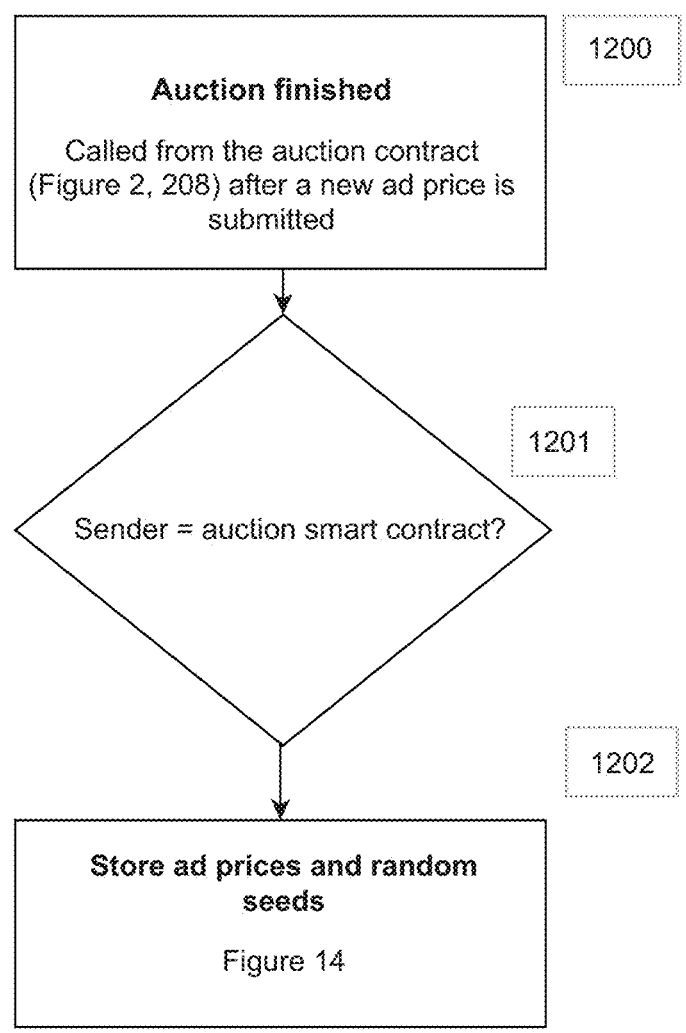
FIG. 12 depicts an exemplary process for closing a communication channel smart contract, according to some embodiments of disclosed invention.

FIG. 12 depicts an exemplary process for closing a communication channel smart contract, according to some embodiments of disclosed invention. As shown in block 1200, the process is initiated by the auction contract (FIG. 2, block 208) after a new ad price is submitted. In block 1201, the sender address is checked to see whether it is the same as the associated auction smart contract address (see, e.g., FIG. 1B, block 105B). The provided random seeds and hashed ad prices are then mapped to their original values as shown in FIG. 12 in block 1202. The state is set to "Finished" and the communication channel smart contract becomes unresponsive to further interactions.

In some embodiments, deviations from the protocol are dealt with as follows. An advertiser who does not respond to a message sent by the auction oracle until the end of a preset response deadline or sends invalid messages to the auction oracle is excluded from ad-viewing and the auction smart contract allows the consumer to collect the respective advance payment instead of the advertiser as described in FIG. 20. This exclusion penalty is also applied if the auction oracle detects an inconsistent reply, i.e. if the advertiser replies to ad prices $p_1 < p_2$ with comparison results "0" and "1" or transmits as responses to ad prices $p_1 > p_2$ comparison results "1" and "0". This test not only excludes random deviations from the protocol, but also limits the reaction scope of malicious advertisers who try to influence the auction result by dynamically generating x.

Figure 13:
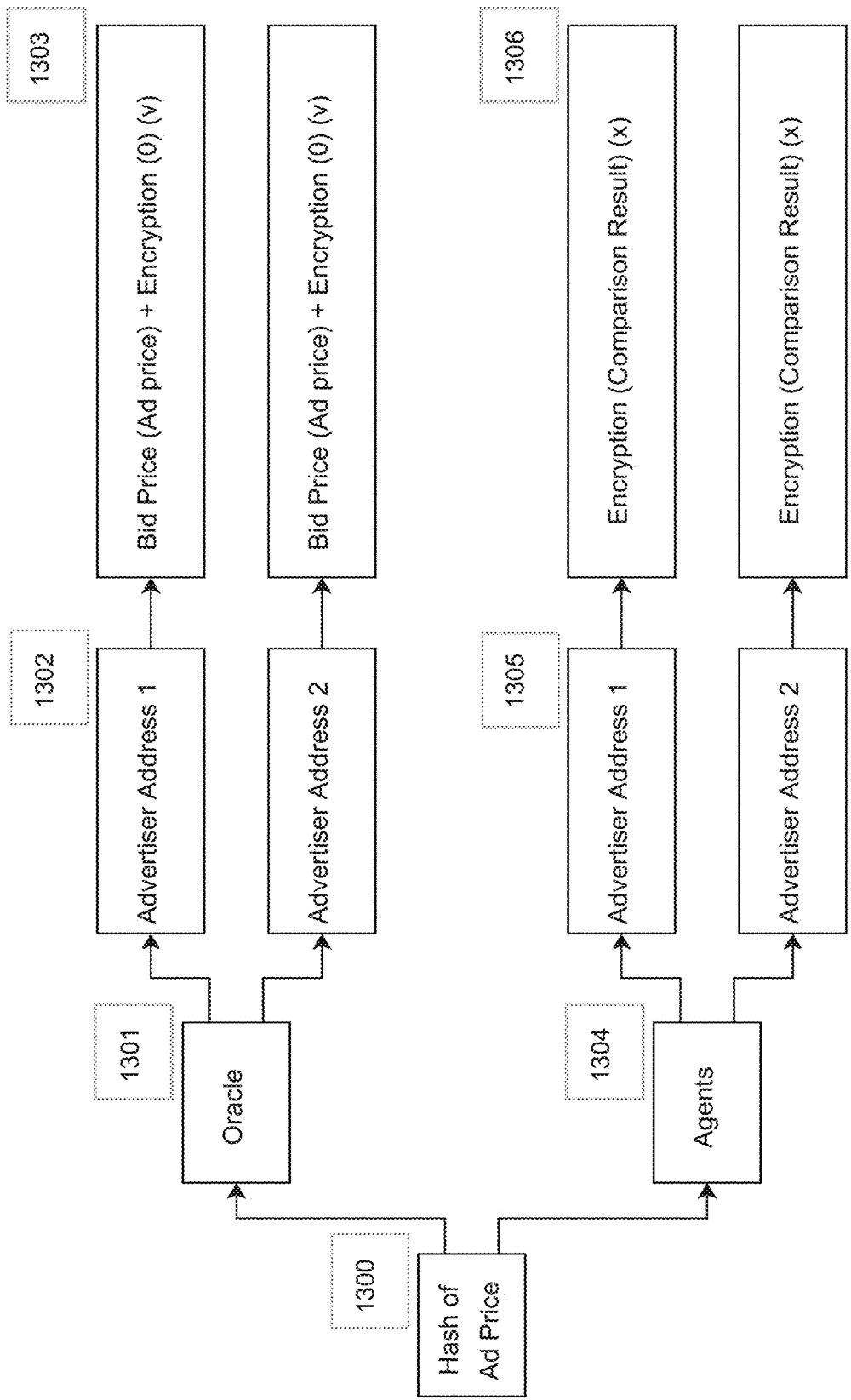
FIG. 13 shows an exemplary ad price hash function of a communication channel smart contract, according to some embodiments of disclosed invention.

FIG. 13 shows an exemplary hash function of a communication channel smart contract, according to some embodiments of disclosed invention. The hash of the new ad price p, v and x for each advertiser are stored in a hash function. As shown, a new ad price submission creates a hashed ad price mapping (1300), map to it the oracle key (1301), and map to the "Oracle" key another hash function (1302), which maps the result of the addition of encrypted 0 to the encoded bid price at position p v to its advertiser address (1303). Response submissions by the advertiser oracles are mapped to the "Advertiser" key (1304), and mapped to the address of the advertiser (1305) and the encrypted comparison result x (1306).

Figure 14:
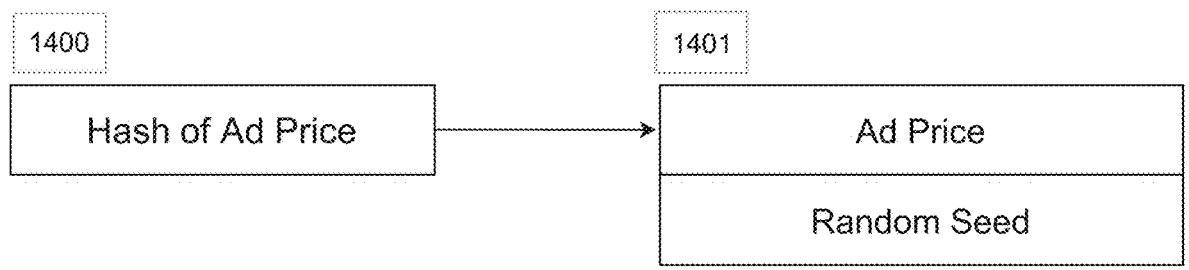
FIG. 14 illustrates an exemplary data structure for an ad price trial hash function of a communication channel smart contract, according to some embodiments of disclosed invention.

FIG. 14 illustrates an exemplary data structure for an ad price trial hash function of communication channel smart contract, according to some embodiments of disclosed invention. As shown, hashed ad prices (1400) are mapped to their original respective ad prices and the random seed (1401).

FIG. 15 depicts an exemplary process for an auction oracle, according to some embodiments of disclosed invention. In block 1500, the auction oracle is initialized with the following data: a starting ad price, and a list of bids made in the auction smart contract. All bids are part of the valid bid list by default. Using an advertiser's (Paillier) public key (n,g) stored in the advertiser's ad bid b the ciphertext stored in the position b[p] is multiplied with the Paillier encryption of 0 to obtain $v = b[p] \cdot r'' \bmod n^2$ The auction oracle hashes the current ad price+random seed and sends it alongside v to the communication channel smart contract, in block 1501. In block 1502, the auction oracle then waits for the advertiser oracle response of the comparison result x until the response deadline (set in FIG. 10) is reached. Subsequently, the auction oracle fetches the advertiser oracles' responses from the communication channel smart contract in block 1502, decrypts them using its private key and extracts the comparison results as first digits. Advertisers' bid prices that are lower than the new ad price are moved from the valid bid list to the overbid bid list to determine valid bid prices in block 1503. Missing or invalid responses by advertiser oracles results in their bid to be moved to the disqualified bid list. In some embodiments, an advertiser with a disqualified ad bid cannot collect her/his advance payment. Rather, this right is transferred to the consumer.

Subsequently, the number of valid bids is compared to the minimum and maximum bid count threshold, in block 1504. If the valid bid count is larger or equal than the maximum threshold or smaller or equal than the minimum threshold, the ad price is modified and the process is repeated, in block 1505. Otherwise, the auction oracle sends an auction report to the auction smart contract, in block 1506 (see, FIG. 17). In some embodiments, the auction report includes:

The new ad price,
The used hashed ad prices and their original values and seeds,
The overbid bids, and
The disqualified bids.

Figure 16:
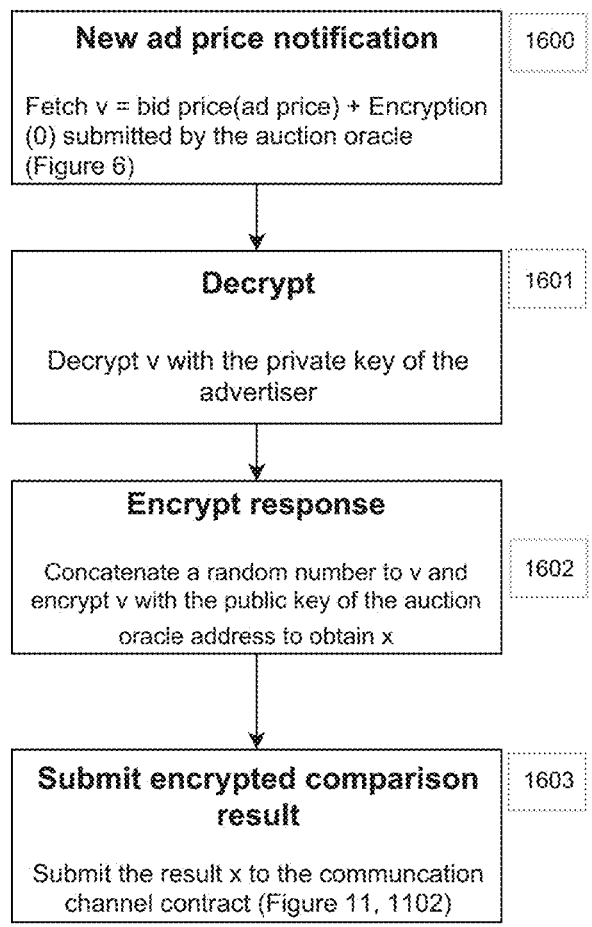
FIG. 16 shows an exemplary process for response creation of an advertiser oracle, according to some embodiments of disclosed invention.

FIG. 16 shows an exemplary process for response creation of an advertiser oracle according to some embodiments of disclosed invention. An advertiser oracle's response is submitted upon receiving a new ad price notification (sent in FIG. 15) from the communication channel smart contract, in block 1600. The value v for the advertiser is located in a hash function (FIG. 13) in the communication channel smart contract. It is mapped to: [current hashed ad price]=>[Oracle]=>[advertiser address]. The value v is decrypted with the private key of the advertiser agent, in block 1601. Then, a random string is concatenated to the comparison result, the resulting value x is then encrypted with the public key of the auction oracle, in block 1602 and sent to the communication channel smart contract via the submit response function, in block 1603.

Figure 17:
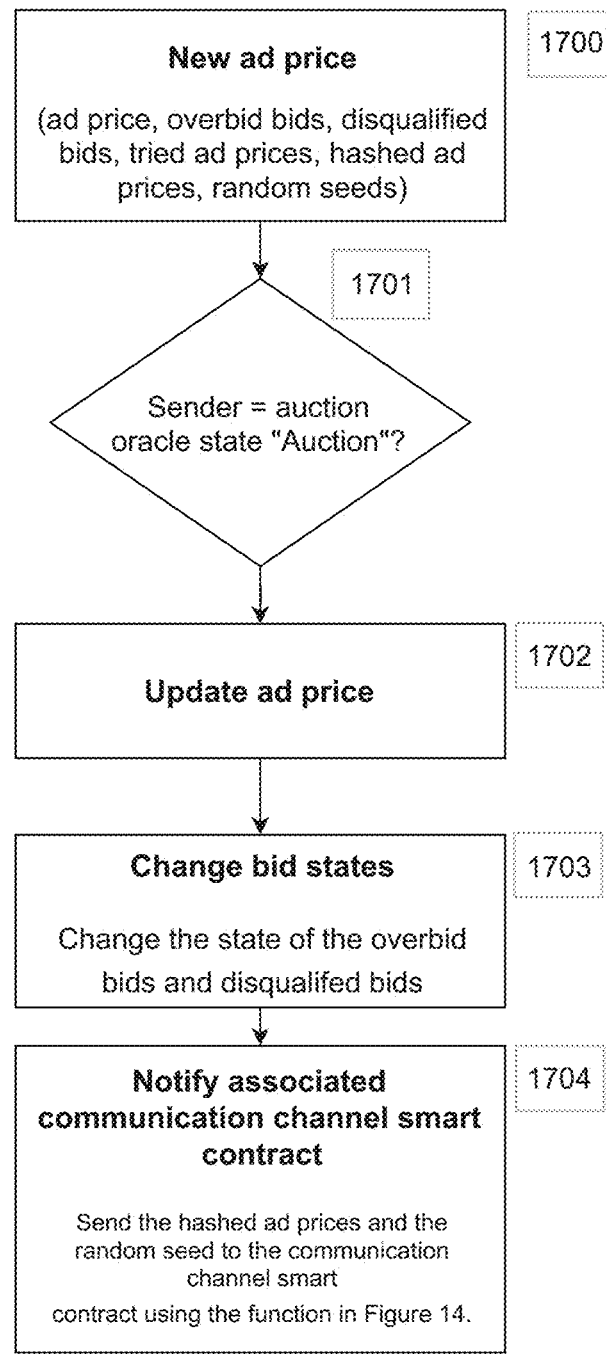
FIG. 17 depicts an exemplary process for a new ad price function of the auction smart contract, according to some embodiments of disclosed invention.

FIG. 17 depicts an exemplary process for a new ad price function of the auction smart contract, according to some embodiments of disclosed invention. This function is called when the auction oracle (FIG. 15) has successfully generated a new ad price, in block 1700. The parameters are:

The new ad price,
Advertiser addresses with an overbid bid,
Advertiser addresses with a disqualified bid,
Hashed ad prices tried by the auction oracle,
The original ad prices of the hashed ad prices tried by the auction oracle, and
The random seeds used when creating tried hashed ad prices.

The sender address has to be the same as the auction oracle address. The state is checked in block 1701 to make sure it is in an "Auction" state. In block 1702, the current ad price is updated to the provided new ad price. The states of the bids, made by advertiser addresses with an overbid bid, is changed to "Overbid" state. The states of the bids, made by advertiser addresses with a disqualified bid, is changed to "Disqualified" state in block 1703. The associated communication channel smart contract is notified next, in block 1704. The finish auction function (e.g., in FIG. 12) is called by providing the hashed ad prices, the original ad prices of the hashed ad prices and the random seed.

Figure 18:
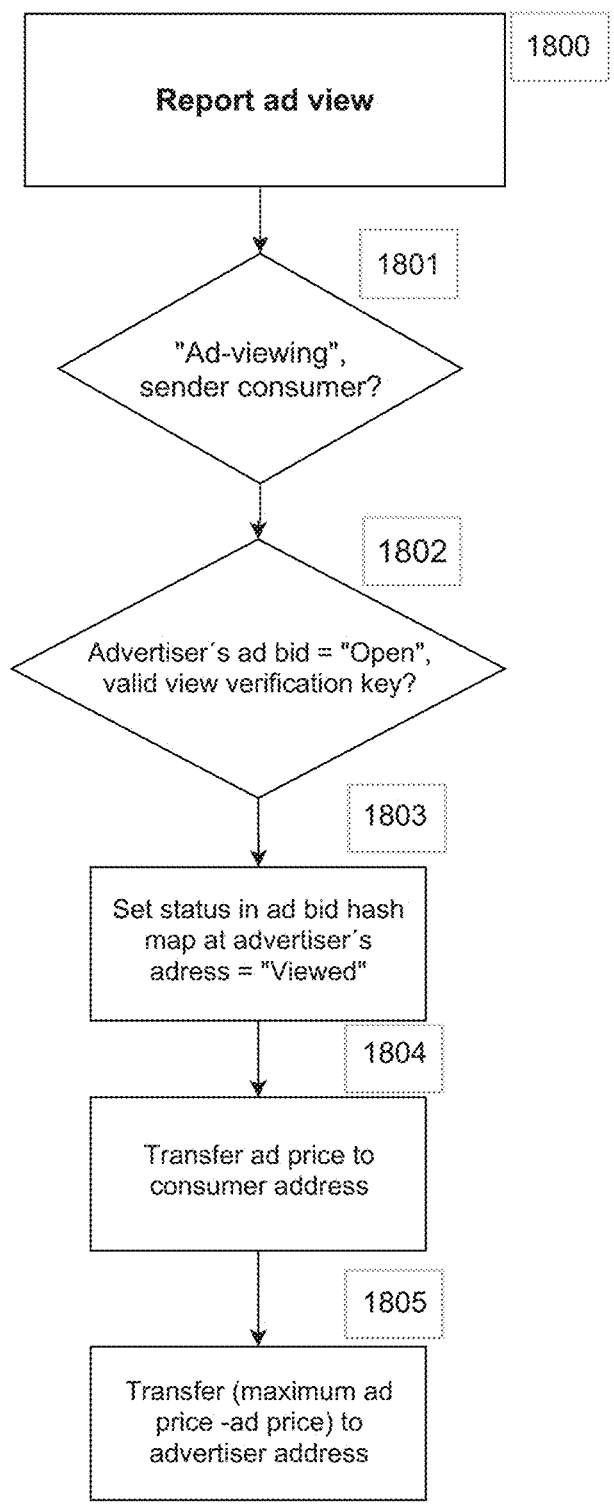
FIG. 18 shows an exemplary process for an ad inspection function of the auction smart contract, according to some embodiments of disclosed invention.

FIG. 18 shows an exemplary process for the processing of the view of an ad by the auction smart contract, according to some embodiments of disclosed invention. The consumer proofs the viewing of an ad by supplying the following parameters:

A proof of viewing, and
The advertiser address of the bid viewed

The sender address is checked to see if it is the same as the consumer address, in block 1801. Also, the state is checked to make sure that it is in "Ad-viewing" state, in block 1801. In some embodiments, the provided proof of viewing is hashed and the auction smart contract compares the resulting hash value to the hashed verification code of the ad bid, located in the bid hash function (FIG. 3) under the provided advertiser address. The two hashes need to match in block 1802 in order for the process to proceed to block 1803. In block 1803, the state of the ad bid is set to "Viewed" state, and the auction smart contract transfers an amount equal to the ad price to the consumer address in block 1804. The difference between the advance payment and the ad price is transferred to the advertiser address, in block 1805.

FIG. 19 depicts an exemplary process for collecting advance payment by an advertiser via the auction smart contract, according to some embodiments of disclosed invention. In block 1900, advertisers of overbid bids can collect the maximum ad price transferred as advance payment, same as advertisers whose bids have not been viewed. The auction state is checked to be in a "Closed" state, in block 1901. Also, the state of the bid, mapped to the sender address in the bid hash function (FIG. 3), is checked to be "Overbid" or "Open," in block 1902. The state of the bid is then set to "advance payment returned," in block 1903. An amount equal to the advance payment (maximum ad price) is transferred to the sender address, in block 904.

FIG. 20 illustrates an exemplary process for penalizing advertisers by an auction smart contract, according to some embodiments of disclosed invention. The advertiser is penalized in block 2000, using the advertiser address of the targeted bid. In block 2001 it is checked whether the sender address is the consumer address and the state of the ad bid is "Disqualified". Subsequently, the status of the bid, located in the bid hash function (FIG. 3) under the provided advertiser address is changed from "Disqualified," to "Penalized," in block 2002, and in block 2003, an amount equal to the advance payment is transferred to the consumer address.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims and drawings.

What is claimed is:

1. A computer implemented method for a uniform price auction of online advertising on a peer-to-peer computer network which determines an ad price to be paid to a consumer for watching an ad based on encrypted bid prices, the method comprising:

deploying an auction smart contract to publish a need from a consumer;

receiving ad bids for an ad by the smart contract, from a plurality of advertisers;

storing the received ad bids in a hash function mapped to the advertiser's address, wherein the stored ad bid includes a hash of a content of the ad encrypted with the consumer's public key, a hashed encrypted binary representation of a bid price, a public key of the advertiser, and a hashed verification code, wherein the bid price is a maximum amount the advertiser is willing to pay the consumer for viewing the content of the ad;

receiving an advance payment equal to a predetermined maximum ad price to guarantee payment, when the consumer has viewed the ad;

setting the ad price to a predetermined default value when the number of ad bids received is below a predetermined number;

when the number of ad bids received is not below a predetermined number, reducing the number of ads that can be displayed by the consumer by increasing the ad price and eliminating ads with bid prices lower than the ad price and iteratively varying the ad price until the number of ads with bid prices higher than the ad price is between a predetermined minimum and maximum via a secure multiparty protocol between an auction oracle and advertiser oracles using a secure communication channel smart contract;

detecting inconsistent behavior of advertiser oracles during the secure multiparty protocol and disqualifying dishonest advertisers;

transmitting the ad price as the payment to the consumer via the peer-to-peer computer network, when the hashed verification code is received from the consumer verifying that the consumer has viewed the content of the ad within an ad-viewing period of time;

transmitting a difference between the advance payment and the ad price to an advertiser whose ad was viewed, by the auction smart contract via the peer-to-peer computer network;

transmitting the advance payment to advertisers whose ad was not viewed, by the auction smart contract via the peer-to-peer computer network;

transmitting the advance payment of disqualified advertisers to the consumer by the auction smart contract via the peer-to-peer computer network; and ending the uniform price auction of online advertising.

2. The method of claim 1, further comprising mapping the received ad bid to an address of an advertiser sending the ad bid.

3. The method of claim 1, further comprising storing the auction smart contract at all nodes of the peer-to-peer computer network; executing a function of a smart contract by all nodes of the peer-to-peer computer network; and storing all transactions in a blockchain.

4. The method of claim 1, wherein advertisers submit the ad bids during a bidding period, and further comprising storing a plurality of states in the auction smart contract to indicate a current state, wherein the plurality of auction states includes a "Bidding", an "Auction", an "Ad-viewing" and a "Closed" state.

5. The method of claim 4, wherein the auction smart contract includes a state-change function for checking whether the state of the smart contract needs to be changed.

6. The method of claim 4, wherein when an auction state check is in an "Ad-viewing" state and a current date is larger than an end of the ad-viewing period, the smart contract changes the state to a "Closed" state, in which a reclaim of unused advance payment by the advertiser and a claim of advance payment of disqualified ad bids by the consumer is possible.

7. The method of claim 1, further comprising:

deploying a secure communication channel by the auction smart contract between the auction oracle and the advertiser oracles, when the auction state is in an "Auction" state;

the auction oracle setting a new ad price and together with advertiser oracles comparing the new ad price to the bid prices to determine a number of ad bids with equal or higher bid prices;

ending the auction, when the number of ad bids with equal or higher bid prices is between a predetermined minimum and maximum number; and setting a different ad price and repeating setting a new ad price until an ad price with a number of ad bids with an equal or higher ad price between a predetermined minimum and maximum number is determined.

8. The method of claim 1, further comprising:

encrypting the bid price by creating a vector of Paillier encrypted 0s and 1s of length (0, . . . , maximum ad price) and setting elements (0 to bid price) to encrypted 1s and elements (bid price+1 to maximum ad price) to encrypted 0s;

storing the vector in a content-addressable peer-to-peer storage network; and transmitting a hash value returned as a key to the auction smart contract as the bid price component of the ad bid.

9. The method of claim 1, wherein the ad bid includes the following status:

an Open status, where open ad bids are allowed be viewed during the ad-viewing period;

an Outbid status, where the bid price of the ad bid is below the ad price;

a Disqualified status, where the advertiser of the bid did not follow the auction protocol correctly;

a Penalized status, where the consumer has claimed an advance payment of the disqualified bid; and an Advance Payment returned status, where the respective advertiser has reclaimed the advance payment.

* * * * *